(12) United States Patent
Lai et al.

(10) Patent No.: US 7,645,330 B2
(45) Date of Patent: Jan. 12, 2010

(54) GAS-LIQUID SEPARATION APPARATUS

(75) Inventors: Cheng-Tien Lai, Tu-Cheng (TW);
Zhi-Yong Zhou, Shenzhen (CN);
Qiao-Li Ding, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 522 days.

(21) Appl. No.: 11/309,918

(22) Filed: Oct. 27, 2006

(65) Prior Publication Data

US 2008/0098898 A1 May 1, 2008

(51) Int. Cl.
*B01D 19/00* (2006.01)

(52) U.S. Cl. .............................. 96/206; 96/208; 95/261; 95/260

(58) Field of Classification Search ................... 96/155, 96/204, 206, 208, 216; 95/261, 260; 55/456; 137/171, 808
See application file for complete search history.

(56) References Cited

U.S. PATENT DOCUMENTS

| | | | |
|---|---|---|---|
| 4,666,476 A * | 5/1987 | Reeve et al. | .................. 96/216 |
| 6,322,616 B1 | 11/2001 | Kennedy et al. | |
| 6,402,799 B1 | 6/2002 | Kokubo et al. | |
| 7,244,293 B2 * | 7/2007 | Morita et al. | .................. 96/204 |
| 7,531,026 B2 * | 5/2009 | Follette et al. | ................. 95/262 |
| 2005/0081716 A1 * | 4/2005 | Morita et al. | .................. 95/241 |

FOREIGN PATENT DOCUMENTS

WO 0241965 A2 5/2002

* cited by examiner

*Primary Examiner*—Duane Smith
*Assistant Examiner*—Douglas J Theisen
(74) *Attorney, Agent, or Firm*—Frank R. Niranjan

(57) ABSTRACT

A gas-liquid separation apparatus includes a container and a separating pipe located in the container. The container includes an annular wall and two lids covering two ends of the wall. The container has a cavity surrounded by the wall and the two lids. An inlet extends through one lid and an outlet extends through the other lid. The separating pipe is disposed in the cavity of the container and in communication with the inlet and the outlet of the container. A plurality of apertures is defined in a body of the separating pipe and in communication with a space inside the separating pipe and the cavity of the container. The liquid with gas dissolved therein enters into the separating pipe via the inlet of the container. The liquid is degassed by the separating pipe. The de-gassed liquid exits the separating pipe via the outlet of the container.

19 Claims, 3 Drawing Sheets

GAS-LIQUID SEPARATION APPARATUS

BACKGROUND OF THE INVENTION

1. Field of the Invention

The present invention relates generally to a gas-liquid separation apparatus, and more particularly to a gas-liquid separation apparatus for separating gas from liquid in a transferring pipe or vessel.

2. Description of Related Art

Nowadays, many systems involve liquid transfer via pipes; for example, cooling liquid is transferred by pipes systems to cool heat generating devices. Generally, the liquid has some gas dissolved therein, which may adversely impact normal work or transfer capacity of the pipe systems.

In order to ensure normal operation of a liquid pipe system, it is desirable to separate the gas from the liquid. However, pipe systems are usually hermetically sealed, and the gas in the vessels cannot escape from the liquid. Therefore a gas-liquid separation apparatus may be used to separate the gas from the liquid. A related gas-liquid separation apparatus generally comprises a large reservoir, a filtrating or rotating impeller located in the reservoir, and other members connecting with the reservoir. However, the related gas-liquid separation apparatus has large bulk, large flowing resistance, complicated configuration and so on.

What is need, therefore, is a gas-liquid separation apparatus with simple configuration.

SUMMARY OF THE INVENTION

A gas-liquid separation apparatus in accordance with a preferred embodiment of the present invention comprises a container and a separating pipe located in the container. The container comprises an annular wall and two lids covering two ends of the wall. The container defines a cavity cooperatively surrounded by the wall and the two lids. An inlet extends through one lid and an outlet extends through the other lid. The separating pipe is disposed in the cavity of the container and in communication with the inlet and the outlet of the container. A plurality of apertures is defined in a body of the separating pipe and in communication with a space inside the separating pipe and the cavity of the container. The liquid with gas dissolved therein enters into the separating pipe via the inlet of the container. The de-gassed liquid exits the separating pipe via the outlet of the container. A spiral-shaped guiding member is fixed inside the separating pipe, by which when the liquid flows through the separating pipe, the gas is separated from the liquid. The separated gas flows via the apertures in the body of the separating pipe into the cavity of the container. Sizes of the apertures are gradually decreased along a direction from the inlet to the outlet.

Other advantages and novel features of the present invention will become more apparent from the following detailed description of preferred embodiment when taken in conjunction with the accompanying drawings, in which:

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present device. Moreover, in the drawings, like reference numerals designate corresponding parts throughout the several views.

DETAILED DESCRIPTION OF THE INVENTION

Figure 1:
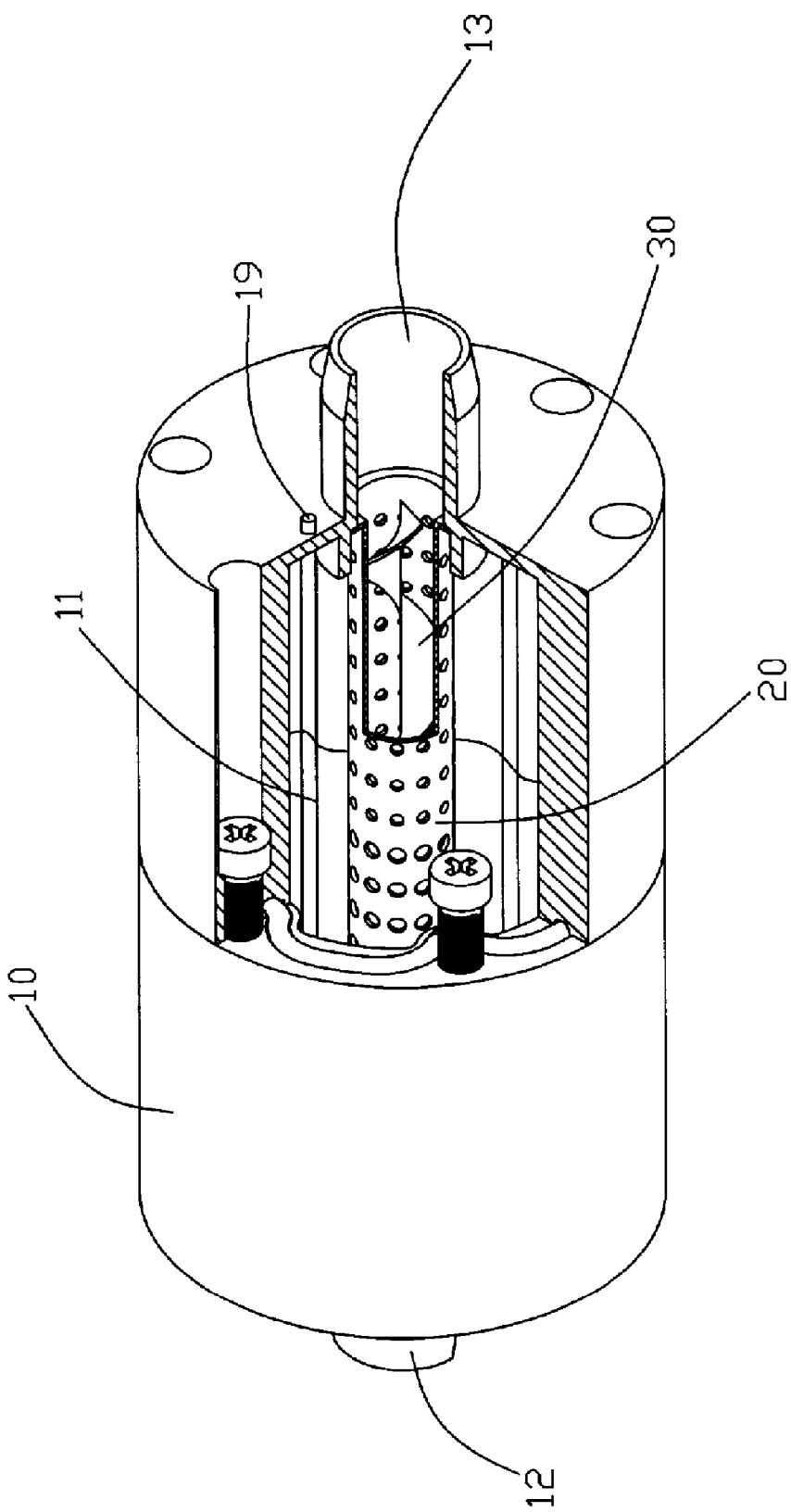
FIG. 1 is an isometric, partially cutaway view of a gas-liquid separation apparatus in accordance with a preferred embodiment of the present invention.
Figure 2:
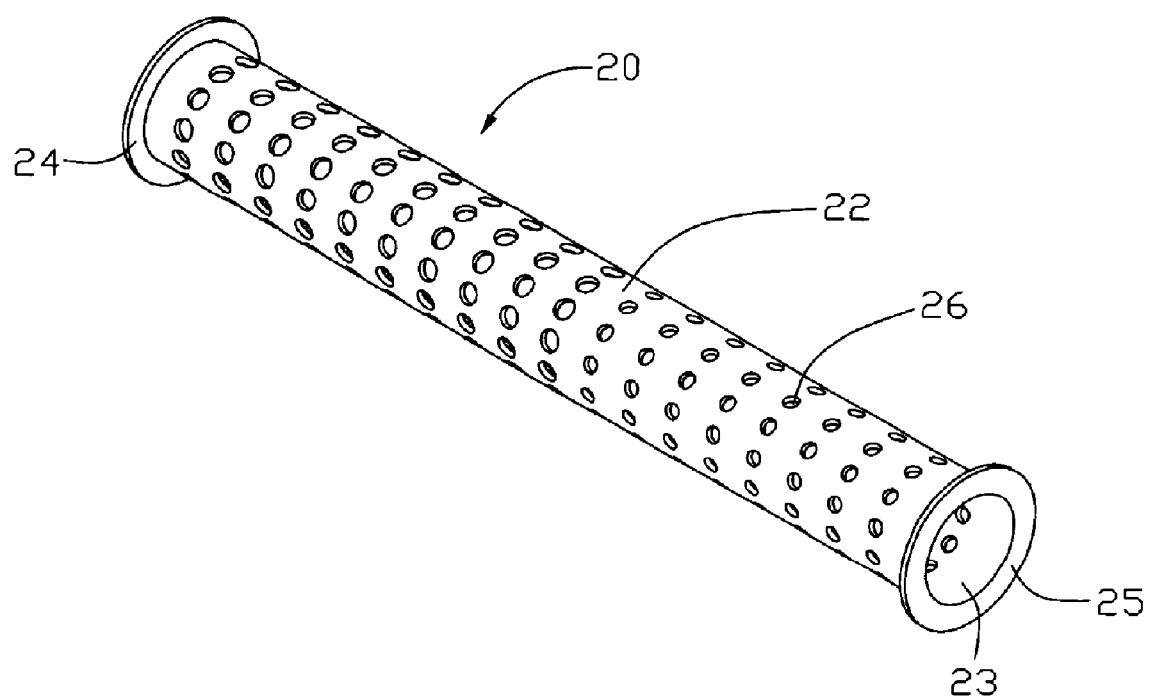
FIG. 2 shows a separating pipe of the gas-liquid separation apparatus of FIG. 1.
Figure 3:
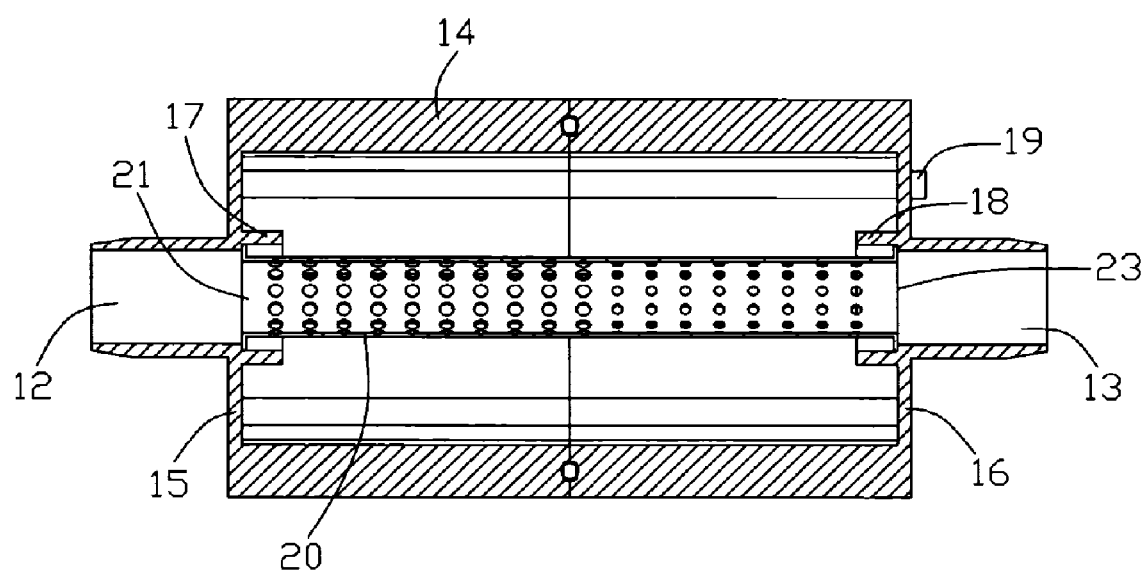
FIG. 3 is an axially cutaway, plane view of the gas-liquid separation apparatus of FIG. 1.

Referring to FIGS. 1-3, a gas-liquid separation apparatus in accordance with a preferred embodiment of the present invention is shown, which is intended to be incorporated in a pipe system (not shown) for separating gas from liquid flowing in the pipe system. The gas-liquid separation apparatus comprises a container 10 and a separating pipe 20 disposed in the container 10.

The container 10 is substantially cylindrical, and comprises two symmetrical portion connected by a plurality of screws (not labeled). A gasket (not labeled) is sandwiched between the two portions, thereby hermetically sealing the two portions together. The container 10 comprises a cylindrical wall 14, a first lid 15 and a second lid 16, each of which covers a respective one of two ends of the wall 14. A cavity 11 is defined in the container 10 by the wall 14, the first and second lids 15, 16. An inlet 12 and an outlet 13 extend through and outwardly from central portions of the first and second lids 15, 16, respectively, for inputting the liquid dissolved with gas into the separating pipe 20 and outputting the degassed liquid out of the separating pipe 20. First and second positioning sleeves 17, 18 integrally extend inwardly from the first and second lids 15, 16, respectively, for positioning the separating pipe 20 in the container 10. Diameter of the first, second positioning sleeves 17, 18 is slightly larger than that of the inlet 12 and outlet 13. The inlet 12 and outlet 13 are in communication with the corresponding first and second sleeve 17, 18. A drain tap 19 located aside the outlet 13 extends outwardly from the second lid 16 and is communication with the cavity 11, for discharging the gas separated from the liquid when a pressure in the container 10 reaches a certain value.

The separating pipe 20 is a cylindrical pipe and is positioned coaxially within the container 10. The separating pipe 20 comprises a cylindrical main body 22 and first, second annular flanges 24, 25 expanding from two ends of the main body 22, respectively. A first port 21 and a second port 23 are defined in each of the two ends of the main body 22. An inner diameter of the main body 22 is smaller than that of the inlet 12 of the container 10. The first, second flanges 24, 25 are hermetically engaged with the first, second sleeves 17, 18 respectively. Therefore, the first port 21 confronts the inlet 12 of the container 10; the second port 23 confronts the outlet 13 of the container 10. The main body 22 defines a plurality of groups of through apertures 26 therein; therefore, a space inside the separating pipe 20 is in communication with the cavity 11 of the container 10. The apertures 26 of a same group are uniform in size and are evenly and circumferentially defined in the main body 22. The apertures 26 of different groups decrease gradually in size from the first port 21 to the second port 23.

As illustrated in FIG. 1, the separating pipe 20 has a spiral-shaped guiding member 30 disposed therein. In this case, the guiding member 30 is made from a metal plate. The guiding member 30 is fixed to an inner wall of the main body 22 of the separating pipe 20 by welding or by interferential means.

In use, the gas-liquid separation apparatus is oriented parallel with a main axis of the container 10 in a horizontal direction, and the drain tap 19 is at an upper location. The container 10 contains a certain amount of the liquid therein, with the separating pipe 20 being submerged under the liquid, but the drain tap 19 being located above the surface of the liquid. The liquid with gas dissolved therein coming from the pipe system rushes into the separating pipe 20 via the inlet 12, and is accelerated at the first port 21 of the separating pipe 20. Some of the liquid in the separating pipe 20 escapes into the cavity 11, because a hydraulic pressure in the separating pipe 20 is larger than that outside the separating pipe 20. A flow rate of the liquid falls; furthermore, the liquid makes centrifugal motion when the liquid encounters the guiding member 30; centrifugal force produced by the motion urges small gas bubbles in the separating pipe 20 to gather into big bubbles with high pressure therein, and the big bubbles are discharged into an upper portion of the cavity 11. Therefore, the gas is separated out of the liquid. The degassed liquid enters into the pipe system (not shown) via the outlet 13.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A gas-liquid separation apparatus comprising:
   a container defining a cavity therein, the container comprising an inlet for inputting liquid with gas dissolved therein and an outlet for outputting the liquid; and
   a separating pipe disposed in the cavity of the container and in communication with the inlet and the outlet of the container, the separating pipe comprising a body defining a plurality of through apertures therein, the through apertures being in communication with a space inside the separating pipe and the cavity of the container, the liquid being degassed when flowing through the separating pipe from the inlet to the outlet;
   wherein the separating pipe has a guiding member disposed therein for impelling the gas to separate out of the liquid.

2. The gas-liquid separation apparatus of claim 1, wherein the guiding member is spiral-shaped in profile.

3. The gas-liquid separation apparatus of claim 1, wherein the apertures of the separating pipe are defined into a plurality of groups, the apertures of a same group being uniform in size.

4. The gas-liquid separation apparatus of claim 3, wherein the apertures of the same group are evenly and circumferentially defined in the body.

5. The gas-liquid separation apparatus of claim 3, wherein the apertures of different groups of the body of the separating pipe decrease in size from the inlet to the outlet of the container.

6. The gas-liquid separation apparatus of claim 1, wherein the container comprises an annular wall and two lids covering two ends of the wall, the inlet and the outlet extending through the two lids, respectively.

7. The gas-liquid separation apparatus of claim 6, wherein each of the two lids of the container extends a sleeve opposite to and in communication with a corresponding inlet or outlet, the separating pipe having two ends thereof engaging with corresponding sleeves of the container.

8. The gas-liquid separation apparatus of claim 7, wherein the separating pipe extends two flanges from corresponding ends of the body thereof, the two flanges engaging in the corresponding sleeves of the container.

9. The gas-liquid separation apparatus of claim 6, wherein one of the lids of the container extends a drain tap aside the outlet thereof and in communication with the cavity of the container, for discharging the gas outside the container.

10. The gas-liquid separation apparatus of claim 1, where a diameter of the body of the separating pipe is smaller than that of the cavity of the container.

11. A gas-liquid separation apparatus comprising:
    a container comprising an annular wall and two lids covering two ends of the wall, a cavity being surrounded by the wall and the two lids, an inlet and an outlet extending through the two lids respectively; and
    a separating pipe disposed in the cavity of the container and in communication with the inlet and the outlet of the container, a plurality of apertures being defined in the separating pipe and in communication with a space inside the separating pipe and the cavity of the container;
    wherein liquid with gas dissolved therein enters into the separating pipe via the inlet of the container, the liquid is degassed by the separating pipe and the de-gassed liquid exits the separating pipe via the outlet of the container.

12. The gas-liquid separation apparatus of claim 11, wherein one of the two lids of the container extends a drain tap aside the outlet thereof, for discharging gas separated from the liquid.

13. The gas-liquid separation apparatus of claim 11, wherein each of the two lids extends a sleeve opposite to and in communication with corresponding inlet or outlet thereof, the separating pipe having two ends thereof engaging with the two sleeves.

14. The gas-liquid separation apparatus of claim 11, wherein the separating pipe has a guiding member located therein for producing centrifugal motion to the liquid in the separating pipe.

15. The gas-liquid separation apparatus of claim 14, wherein the guiding member is spiral-shaped.

16. A gas-liquid separation apparatus comprising:
    a container defining a cavity therein, the container comprising an inlet for inputting liquid with gas dissolved therein and an outlet for outputting the liquid; and
    a separating pipe disposed in the cavity of the container and in communication with the inlet and the outlet of the container, the separating pipe comprising a body defining a plurality of through apertures therein, the through apertures being in communication with a space inside the separating pipe and the cavity of the container, the liquid being degassed when flowing through the separating pipe from the inlet to the outlet;
    wherein the apertures of the separating pipe are defined into a plurality of groups, the apertures of a same group being uniform in size.

17. The gas-liquid separation apparatus of claim 16, wherein the apertures of the same group are evenly and circumferentially defined in the body.

18. The gas-liquid separation apparatus of claim 16, wherein the apertures of different groups of the body of the separating pipe decrease in size from the inlet to the outlet of the container.

19. The gas-liquid separation apparatus of claim 16, where a diameter of the body of the separating pipe is smaller than that of the cavity of the container.

* * * * *

UNITED STATES PATENT AND TRADEMARK OFFICE
CERTIFICATE OF CORRECTION

PATENT NO. : 7,645,330 B2
APPLICATION NO. : 11/309918
DATED : January 12, 2010
INVENTOR(S) : Lai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 599 days.

Signed and Sealed this

Sixteenth Day of November, 2010

David J. Kappos
*Director of the United States Patent and Trademark Office*